(12) United States Patent
Jouraku (10) Patent No.: US 8,186,736 B2
(45) Date of Patent: May 29, 2012

(54) HINGE MECHANISM AND AUTOMOTIVE LUGGAGE BOARD STRUCTURE USING THE SAME

(75) Inventor: Takeshi Jouraku, Kariya (JP)

(73) Assignee: Meiwa Industry Co., Ltd., Atsugi-shi (JP)

( * ) Notice: Subject to any disclaimer, the term of this patent is extended or adjusted under 35 U.S.C. 154(b) by 265 days.

(21) Appl. No.: 12/593,179

(22) PCT Filed: Mar. 21, 2008

(86) PCT No.: PCT/JP2008/055328
§ 371 (c)(1),
(2), (4) Date: Sep. 25, 2009

(87) PCT Pub. No.: WO2008/117764
PCT Pub. Date: Oct. 2, 2008

(65) Prior Publication Data
US 2010/0026031 A1 Feb. 4, 2010

(30) Foreign Application Priority Data
Mar. 28, 2007 (JP) .................................. 2007-085447

(51) Int. Cl.
*B60R 5/04* (2006.01)
(52) U.S. Cl. .......... 296/37.16; 16/72; 224/542; 224/547
(58) Field of Classification Search ............... 296/37.16, 296/37.8, 37.1, 37.2, 37.3, 37.5, 24.43; 224/542, 224/547; 248/289.11, 289.31; 16/72, 277
See application file for complete search history.

(56) References Cited

U.S. PATENT DOCUMENTS

| 125,817 | A | * | 4/1872 | Kimball ......................... 49/385 |
| 3,628,215 | A | | 12/1971 | Everburg |
| 5,716,091 | A | * | 2/1998 | Wieczorek ................. 296/37.16 |
| 7,600,800 | B2 | * | 10/2009 | Suzuki ....................... 296/37.16 |

FOREIGN PATENT DOCUMENTS

| EP | 1468928 A1 | 10/2004 |
| JP | 62-148447 U | 9/1987 |
| JP | 08-107809 A | 4/1996 |
| JP | 10-109578 A | 4/1998 |
| JP | 2001-354069 A | 12/2001 |
| JP | 2003-118500 A | 4/2003 |
| JP | 2006-143037 A | 6/2006 |
| JP | 2006-199063 A | 8/2006 |
| JP | 2006-219017 A | 8/2006 |
| JP | 2006-335164 A | 12/2006 |

OTHER PUBLICATIONS

International Preliminary Report on Patentability, PCT/JP2008/055328, Oct. 29, 2009, 5 pgs.

\* cited by examiner

Primary Examiner — Glenn Dayoan
Assistant Examiner — Pinel Romain
(74) Attorney, Agent, or Firm — Foley & Lardner LLP (57) ABSTRACT

A hinge mechanism 29 that rotatably provides a luggage board 27 and an auxiliary board 28 continuously with each other while interposing an integral hinge 13 therebetween, in which a space portion S is provided between mutually opposite end surfaces 20 and 21 of the luggage board 27 and the auxiliary board 28, wherein a restoring force generation portion 30*a* of a spring member 30 is housed in the space portion S, and in addition, both end portions 31 and 32 of the spring member 30 are fixed to the luggage board 27 and the auxiliary board 28, respectively.

6 Claims, 13 Drawing Sheets

HINGE MECHANISM AND AUTOMOTIVE LUGGAGE BOARD STRUCTURE USING THE SAME

TECHNICAL FIELD

The present invention relates to a hinge mechanism and an automotive luggage board structure using the same.

BACKGROUND ART

A luggage room is formed between a rear seat back of an automobile and a back door thereof. This luggage room is made expandable by tilting forward the rear seat back provided so as to be tiltable forward. Then, a luggage board is provided on a bottom surface of the luggage room.

As heretofore disclosed in Japanese Patent Laid-Open Publication No. 2003-118500, as a luggage board structure, a structure has been known, in which a hinge recessed groove is additionally provided on a spacer board that is attached to a front edge portion of a luggage floor trim and hides a gap between the luggage floor trim and a rear seat, and a spring member is attached to the hinge recessed groove so that a front half portion of the spacer board can sag in up and down directions from the hinge recessed groove taken as a base point, and so that a front side of the spacer board can be always urged in a down direction from the hinge recessed groove taken as such a base, whereby the spacer board is allowed to follow a forward tilting operation of the rear seat back.

However, in such a conventional technology, the hinge recessed groove as a rotation center of the spacer board and a center shaft as a rotation center of the spring member are located at positions different from each other, and accordingly, there is an apprehension that rotations of the spacer board and the spring member may be hindered by a relative positional shift of both thereof, which occurs at the time when both thereof make the rotations.

Therefore, as disclosed in Japanese Patent Laid-Open Publication No. 2006-143037, there has been known one in which a tip end of an arm of the spring member is slidably engaged with an auxiliary board in order to absorb the relative positional shift.

However, in order to slidably engage the tip end of the arm of the spring member with the auxiliary board, it is necessary to elongate a length of the arm of the spring member by an amount that the relative positional shift is absorbed in addition to that a hinge mechanism of the spacer board and the spring member becomes complicated. Accordingly, there is a problem that weight of the structure is increased. In particular, when a rotation angle of the spacer board is increased, the relative positional shift is also increased, and accordingly, such a problem of the weight increase significantly appears in the case where the rotation angle of the spacer board is increased.

In this connection, it is an object of the present invention to obtain a hinge mechanism capable of increasing the rotation angle by means of a lightweight and simple structure, and to obtain an automotive luggage board structure using the hinge mechanism.

DISCLOSURE OF THE INVENTION

An invention according to claim 1 is a hinge mechanism that rotatably provides a pair of boards continuously with each other while interposing an integral hinge therebetween, in which a space portion is provided between mutually opposite end surfaces of the pair of boards, characterized in that a restoring force generation portion of a spring member is housed in the space portion, and in addition, one end portion of the spring member is fixed to one of the pair of boards, and the other end portion of the spring member is fixed to the other board.

An invention according to claim 2 is an automotive luggage board structure, including: a luggage board that forms a bottom surface of a luggage room formed in a rear of a rear seat back reclinable forward and backward; an auxiliary board rotatably provided continuously with a front end of the luggage board while interposing an integral hinge therebetween; and a spring member, in which a restoring force generation portion is housed in a space portion provided between the front end of the luggage board and a rear end of the auxiliary board, and both end portions are fixed to the luggage board and the auxiliary board, characterized in that the auxiliary board is always urged by the spring member in a direction of thrusting a back surface of the rear seat back.

In the automotive luggage board structure according to claim 2, an invention according to claim 3 is characterized in that the luggage board has a front surface side sheet and a back surface side sheet, and the auxiliary board has a front surface side sheet and a back surface side sheet, and at a time when the front surface side sheet of the luggage board and the front surface side sheet of the auxiliary board are made substantially horizontal to each other, a height of the integral hinge is adapted to become substantially the same as a height of the front surface side sheet of the luggage board and the front surface side sheet of the auxiliary board.

In the automotive luggage board structure according to either one of claims 2 and 3, an invention according to claim 4 is characterized in that the back surface side sheet of the luggage board or the back surface side sheet of the auxiliary board is formed of resin, and both end portions of the spring member are welded and fixed to the back surface side sheets of the luggage board and the auxiliary board by resin plates.

In the automotive luggage board structure according to either one of claims 2 and 3, an invention according to claim 5 is characterized in that a reinforcement is provided in an inside of the luggage board or the auxiliary board, and at least one of both end portions of the spring member is inserted into an inside of the luggage board or the auxiliary board, and is fixed to the reinforcement in a state of being engaged therewith.

BEST MODE FOR CARRYING OUT THE INVENTION

A description will be made below in detail of embodiments of the present invention while referring to the drawings.

Figure 1:
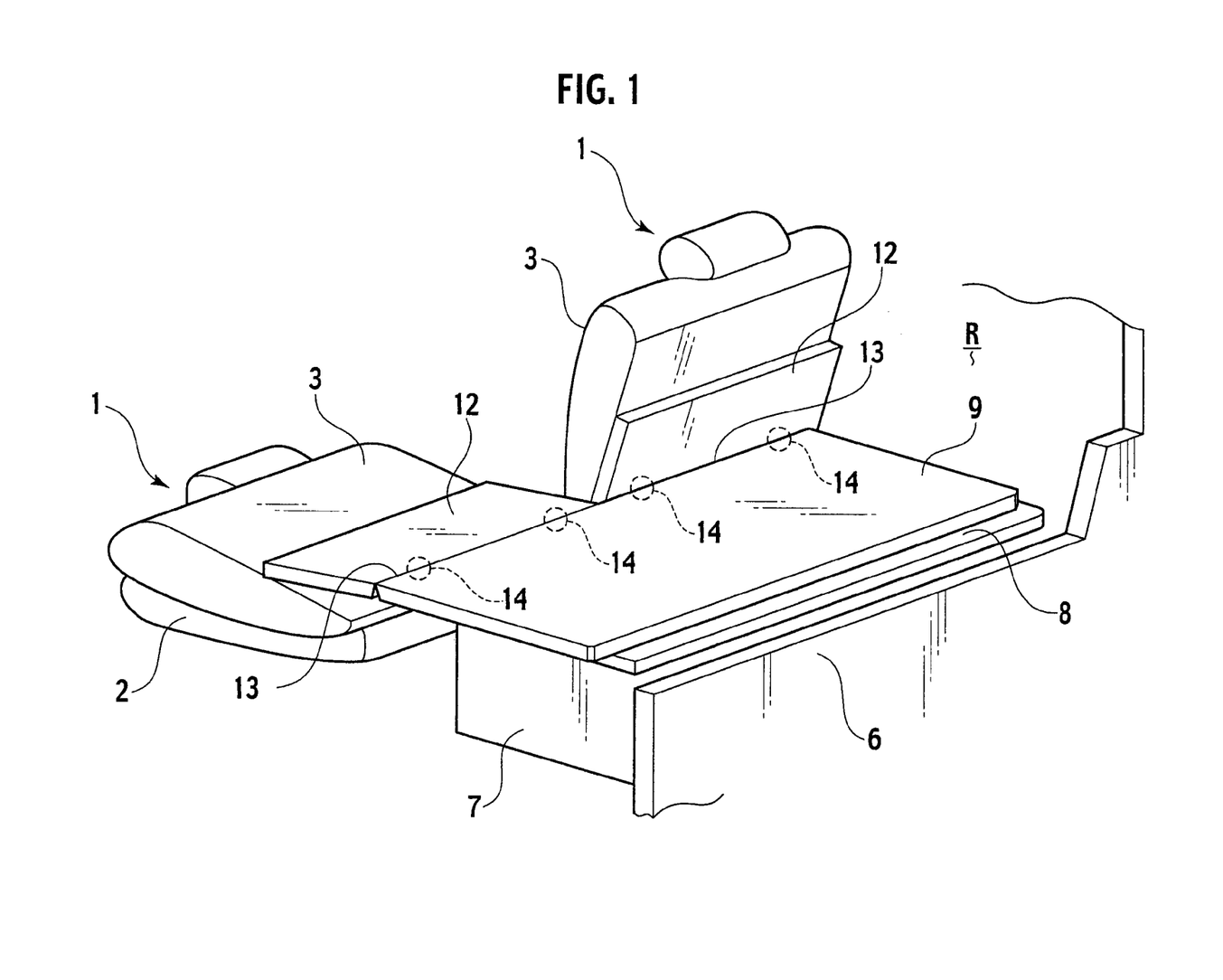
FIG. 1 is a perspective view showing a luggage board structure according to a first embodiment of the present invention.
Figure 2:
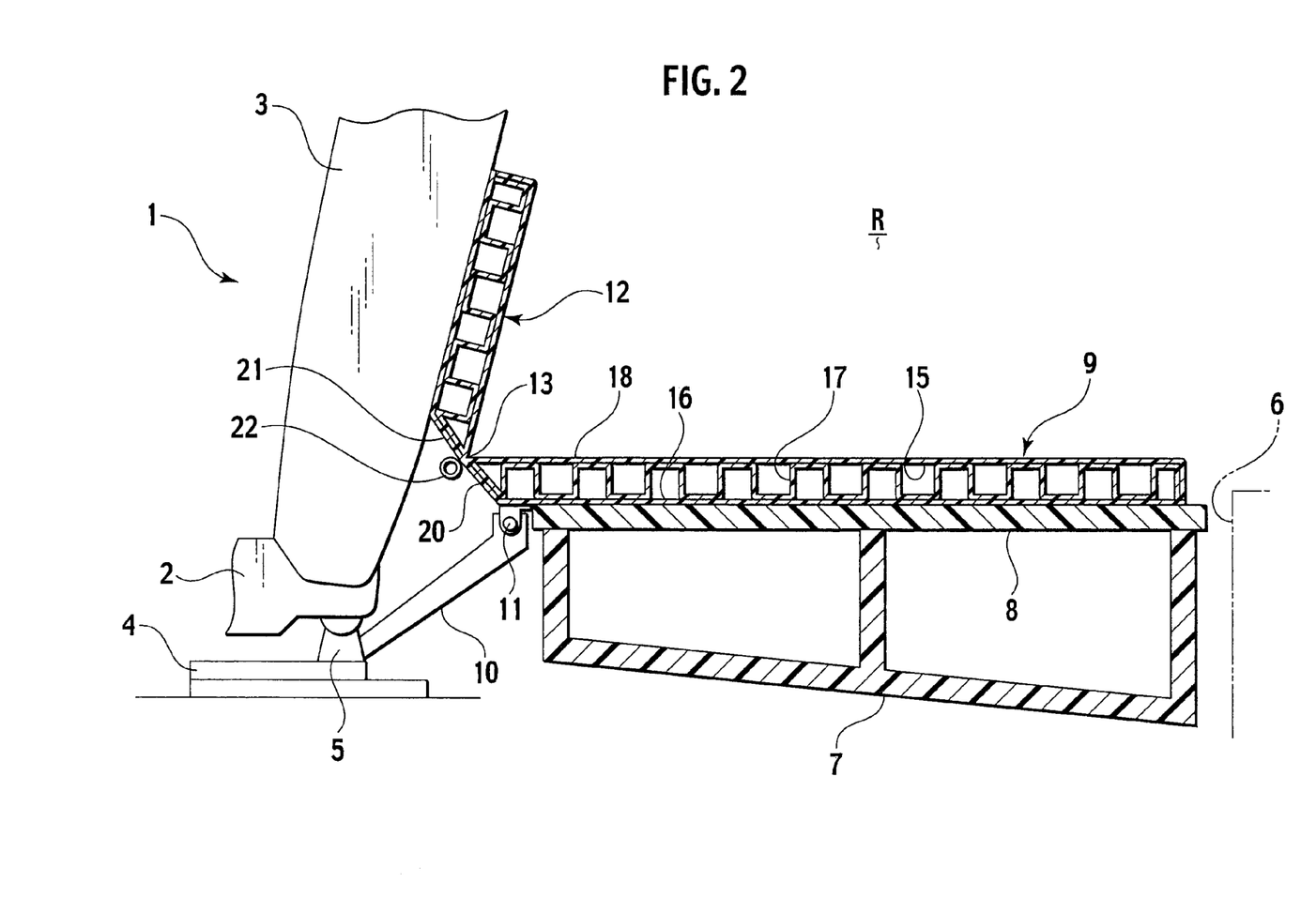
FIG. 2 is a cross-sectional view showing a luggage board and an auxiliary board in a case where a rear seat back according to the first embodiment of the present invention is in a normal state.
Figure 3:
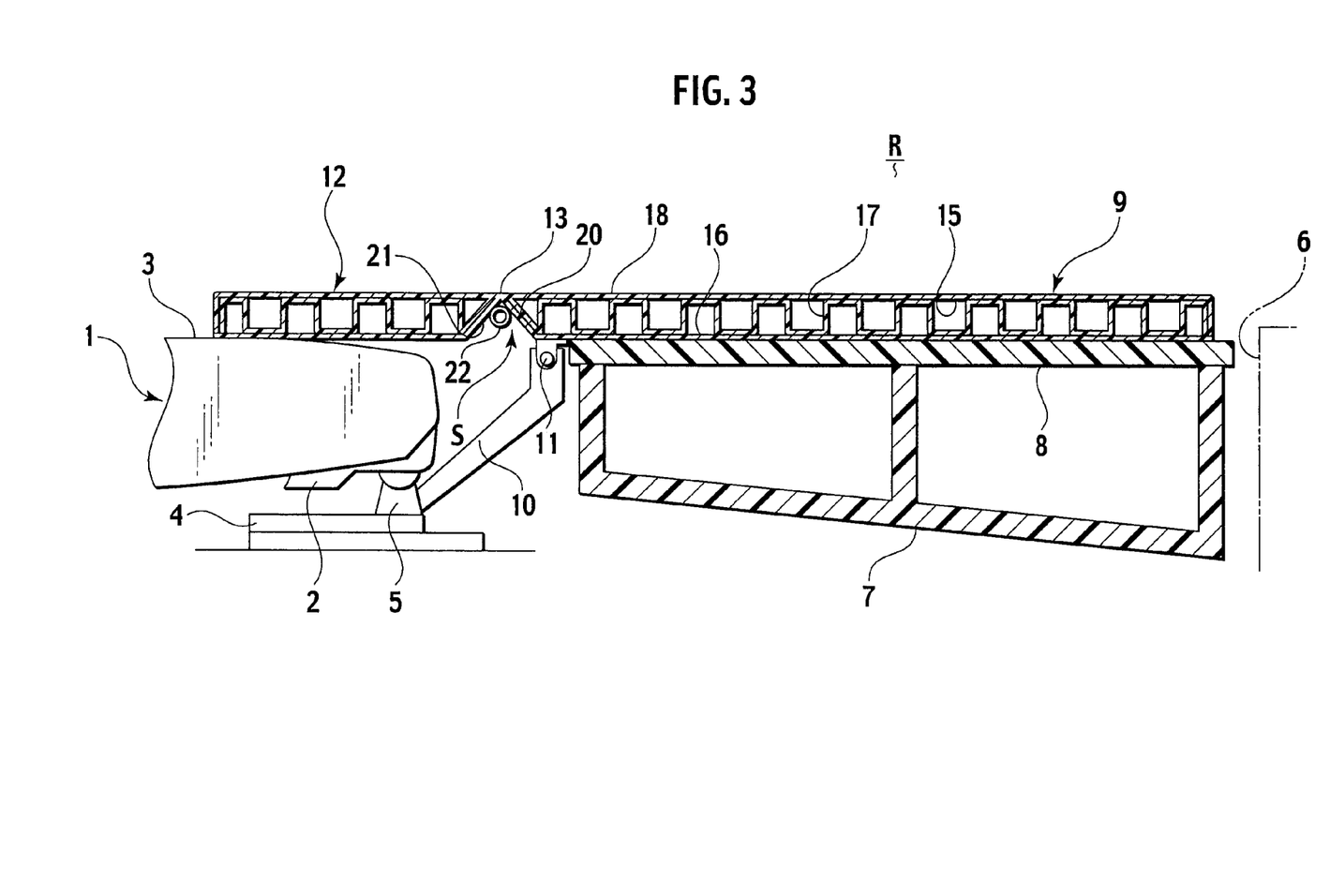
FIG. 3 is a cross-sectional view showing the luggage board and the auxiliary board in a case where the rear seat back according to the first embodiment of the present invention is in a forward tilted state.
Figure 4:
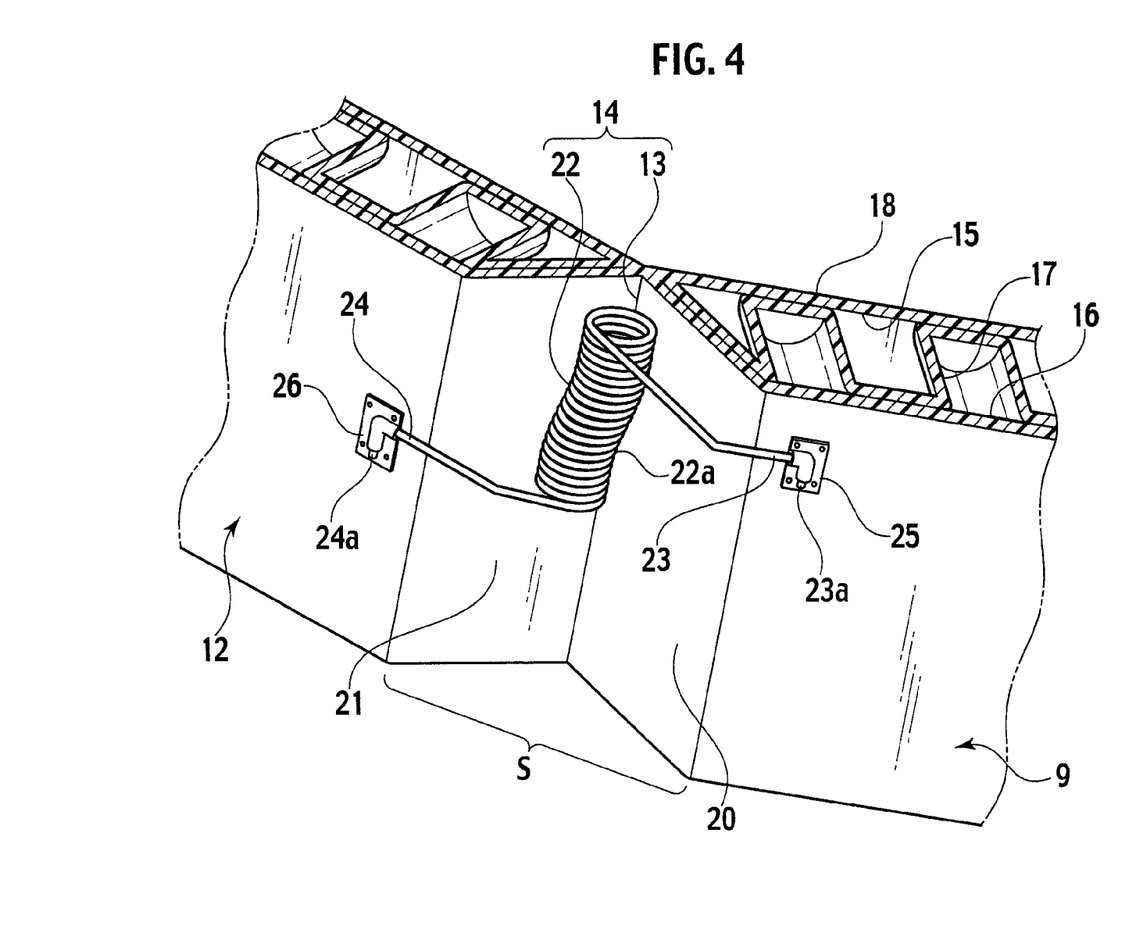
FIG. 4 is a perspective view showing a coil spring in an inside of a space portion according to the first embodiment of the present invention.
Figure 5:
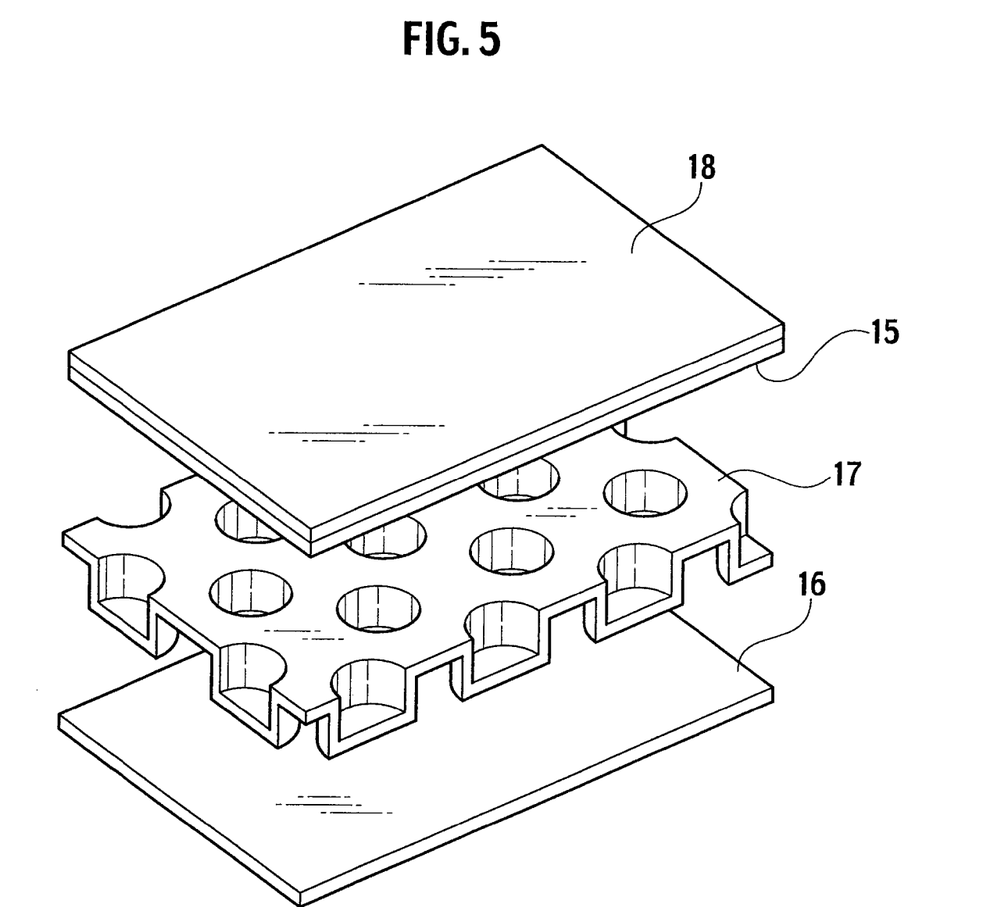
FIG. 5 is an exploded perspective view showing a structure of the luggage board according to the first embodiment of the present invention.
Figure 6:
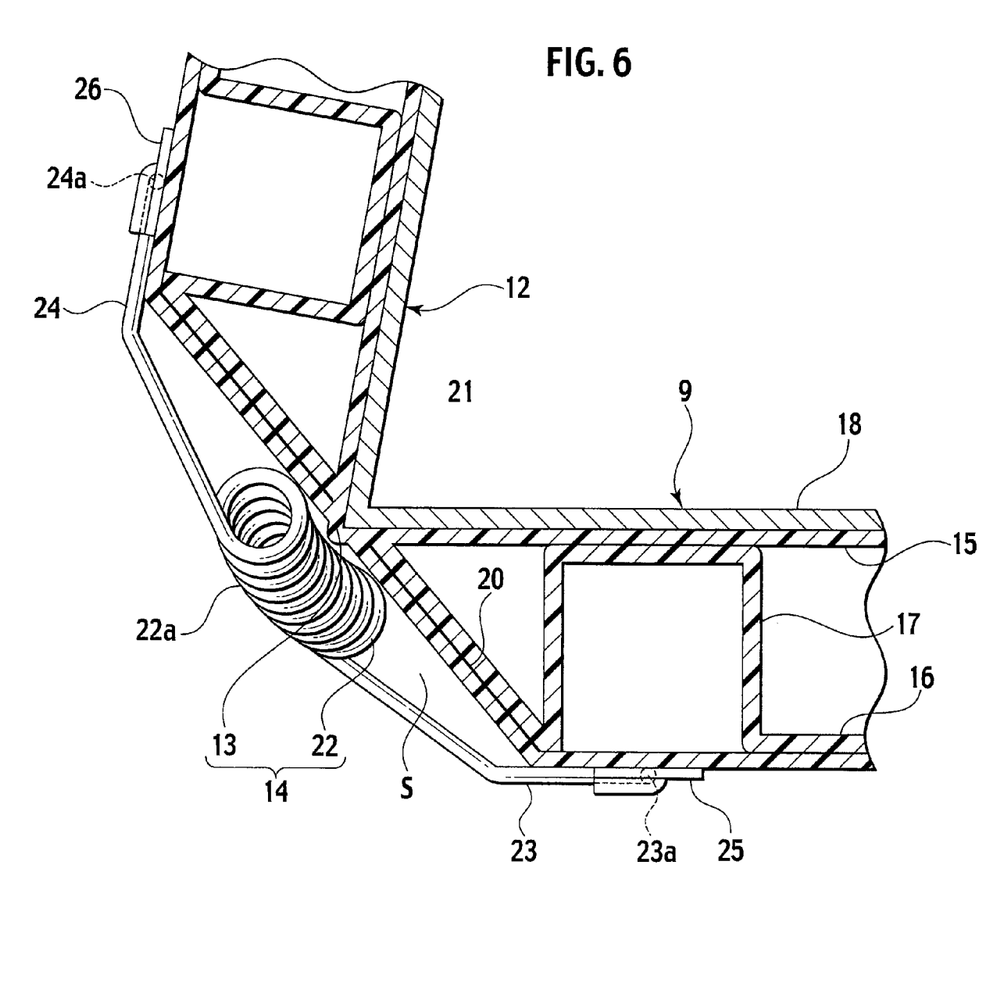
FIG. 6 is a cross-sectional view showing a vicinity of an integral hinge in an erected state of the auxiliary board according to the first embodiment of the present invention.
Figure 7:
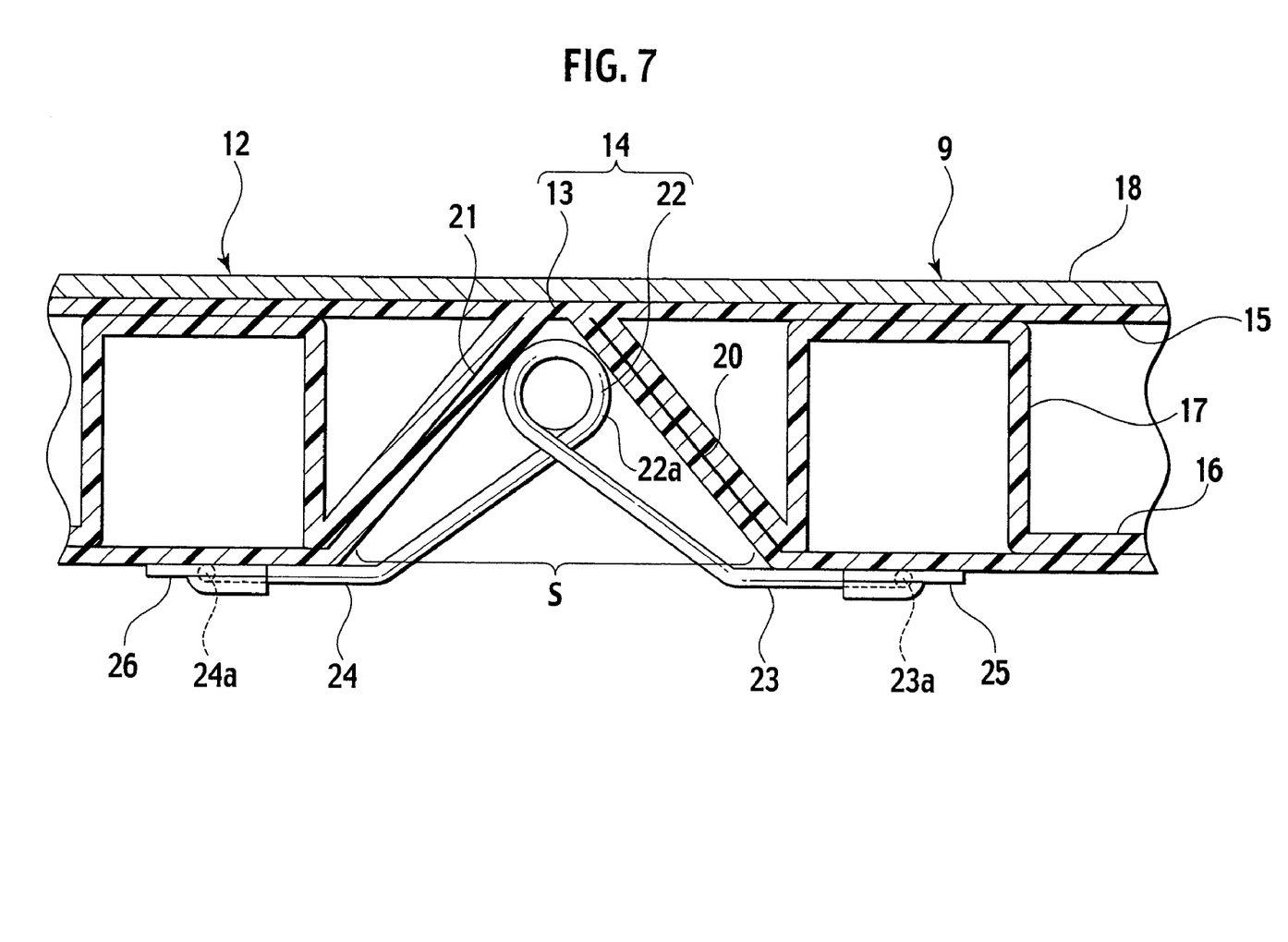
FIG. 7 is a cross-sectional view showing the vicinity of the integral hinge in a forward tilted state of the auxiliary board according to the first embodiment of the present invention.

(First Embodiment) FIG. 1 is a perspective view showing a luggage board structure according to this embodiment, FIG. 2 is a cross-sectional view showing a luggage board and an auxiliary board in a normal state where a rear seat back is erected, FIG. 3 is a cross-sectional view showing the luggage board and the auxiliary board, showing a case where the rear seat back is in a forward tilted state, FIG. 4 is a perspective view showing a coil spring in an inside of a space portion, FIG. 5 is an exploded perspective view showing a structure of the luggage board, FIG. 6 is a cross-sectional view showing a vicinity of an integral hinge in an erected state of the auxiliary board, and FIG. 7 is a cross-sectional view showing the vicinity of the integral hinge in a forward tilted state of the auxiliary board.

A right and left pair of rear seats 1 are placed on a rear side of a vehicle cabin inside of an automobile. The rear seats 1 include rear seat cushions 2 and rear seat backs 3. In this embodiment, leg portions 5 of the rear seat cushions 2 are fixed to slide rails 4, and the rear seat cushions 2 are made slidable forward and backward. Moreover, the rear seat backs 3 are made reclinable forward and backward with respect to the rear seat cushions 2, and are made foldable by being largely tilted forward.

A luggage room R is formed in a rear of the rear seat backs 3. Then, a back panel 6 of a vehicle body is formed in a rear of the luggage room R. An opening of this back panel 6 is opened and closed by a back door (not shown).

On a floor panel of the luggage room R, a storage box 7 that houses tools and a spare tire therein is placed. A deck board 8 is mounted on the storage box 7. The deck board 8 is engaged with the storage box 7, and is made openable, closable and detachable only in a case where these operations are necessary.

A luggage board 9 as a member that composes a bottom surface of the luggage room R is mounted on the deck board 8.

Lower portions of a front end of the luggage board 9 are rotatably coupled to tip ends of brackets 10 extended from the leg portions 5 of the rear seat cushions 2 while interposing a rotation shaft 11 therebetween. Hence, the luggage board 9 is adapted to slide forward and backward on the deck board 8 together with each of the rear seat cushions 2 at the time of sliding the rear seat cushion 2 forward and backward. Moreover, the entirety of the luggage board 9 is also rotatable upward about the rotation shaft 11.

Onto the front end of the luggage board 9, a right and left pair of auxiliary boards 12 individually corresponding to the right and left rear seat backs 3 are coupled. The respective auxiliary boards 12 are rotatably coupled to the luggage board 9 while interposing an integral hinge 13 therebetween. Then, as shown in FIG. 1, on the integral hinge 13 between the auxiliary boards 12 and the luggage board 9, a right and left pair of hinge mechanisms 14 are placed for each of the auxiliary boards 12.

Next, a description will be made of the luggage board 9, the auxiliary boards 12 and the hinge mechanisms 14.

Each of the luggage board 9 and the auxiliary boards 12 includes two upper and lower cover sheets (front surface side sheet and back surface side sheet) 15 and 16, and has a three-layer structure in which the cover sheets 15 and 16 and a core sheet 17 are welded to one another in a state where the core sheet 17 is sandwiched between the cover sheets 15 and 16. Then, peripheral edge portions of both of the luggage board 9 and the auxiliary boards 12, which extrude the integral hinge 13, are subjected to end treatment. In this embodiment, one made of polypropylene (PP) as thermoplastic resin is used as each of the cover sheets 15 and 16 and the core sheet 17. Note that thermoplastic resin such as acrylonitrile butadiene styrene resin (ABS), polystyrene resin (PS) and polyethylene (PE) is also usable as a material of the cover sheets and the core sheet.

The core sheet 17 has an uneven shape in cross section, which has columnar bosses. This core sheet 17 is sandwiched between the cover sheets 15 and 16, whereby each of the luggage board 9 and the auxiliary boards 12, which have high rigidity though are lightweight and thin, can be formed. Moreover, a carpet 18 is adhered onto an upper surface of each of the cover sheets 15 on the front surface side.

In this embodiment, the pair of auxiliary boards 12 are individually provided integrally and continuously with the front end of the luggage board 9 while interposing the integral hinge 13 therebetween. Specifically, a pair of metal dies (not shown), which are allowed to correspond to an outer peripheral shape of one board in which the luggage board 9 and the auxiliary boards 12 are integrated with one another, are used, and at the time of performing end treatment and die cutting for an outer peripheral edge portion of the above-described one board, the cover sheet 16 on the back surface side is pressed by a pressing member, which is provided on the back surface side metal die, from the lower side so as to make a line along a vehicle width direction. Then, the cover sheet 16 is polymerized with the cover sheet 15 and thermally welded thereto to form the integral hinge 13, whereby the luggage board 9 and the auxiliary boards 12 are provided integrally and continuously with each other while interposing the integral hinge 13 therebetween. Note that the integral hinge may be formed by the pressing member after forming the integrated one board by performing the end treatment and the die cutting therefor.

As described above, since the integral hinge 13 is formed by welding the cover sheet 16 on the back surface side to the cover sheet 15 on the front surface side to each other in a state where both thereof are aligned with each other, the integral hinge 13 becomes flush with the cover sheet 15 on the front surface side. Specifically, the integral hinge 13 is formed so that a height thereof can become substantially the same as a height of the cover sheet 15 on the front surface side of the luggage board 9 and of the cover sheets 15 on the front surface side of the auxiliary boards 12 in a state where the cover sheet 15 on the front surface side of the luggage board 9 and the cover sheets 15 on the front surface side of the auxiliary boards 12 are made substantially horizontal to each other (that is, in a state where the auxiliary boards 12 are arrayed in line with the luggage board 9).

Then, in such a state, when an end surface (front end of the luggage board 9) 20 of the luggage board 9 and end surfaces (rear ends of the auxiliary boards 12) 21 of the auxiliary boards 12 are opposed to each other while sandwiching the integral hinge 13 therebetween, these end surfaces 20 and 21 become inclined surfaces cleared from each other so as to expand an interval therebetween downward. Specifically, a space portion S having a substantially triangular shape, which goes along the vehicle width direction, is formed under the integral hinge 13. As described above, in such a state, the integral hinge 13 is formed at the same height as that of each of the cover sheets 15 on the front surface side, and accordingly, the space portion S formed under the integral hinge 13 is increased.

Then, two coil springs (spring members) 22 are attached to each of the auxiliary boards 12 so as to be interposed between the end surface 20 and the end surfaces 21.

Each of the coil springs 22 includes a coil portion (restoring force generation portion) 22a that generates twist restoring force, and on both ends thereof, includes end portions 23 and 24 as fixed portions to be attached to the luggage board 9 and the auxiliary board 12.

Then, the coil portion 22a is housed in the above-described space portion S. In particular, since the space portion S is large in this embodiment, the coil portion 22a can be housed in the space portion S more surely, and enhancement of an appearance of the luggage board structure can be achieved.

The end portions 23 and 24 on both sides of the coil spring 22 individually have lengths reaching the cover sheets 16 on the back surface sides of the luggage board 9 and the auxiliary board 12. On terminal ends of the end portions 23 and 24, bent portions 23a and 24a bent in an L shape toward an axial direction of the coil spring 22 are formed, respectively.

Then, the bent portions 23a and 24a are individually fixed to the cover sheets 16 on the back surface sides of the luggage board 9 and the auxiliary board 12 by strip-like resin plates 25 and 26. These resin plates 25 and 26 are made of polypropylene, and have shapes straddling the bent portions 23a and 24a, and both end portions thereof are fixed to the cover sheets 16 by ultrasonic welding. As described above, the resin plates 25 and 26 are welded to the cover sheets 16, whereby the end portions 23 and 24 of the coil spring 22 are fixed to the luggage board 9 and the auxiliary board 12, respectively. Accordingly, a fixing structure of the coil spring 22 can be made into a simple structure.

In this embodiment, each of the hinge mechanisms 14 is composed of the integral hinge 13 having the space portion S on the back surface side thereof, and of the coil spring 22, in which the coil portion 22a is housed in the space portion S, and the end portions 23 and 24 are fixed to the luggage board 9 and the auxiliary board 12, respectively.

Note that, in this embodiment, each of the auxiliary boards 12 is adapted to be always urged in a direction of thrusting a back surface of the rear seat back 3. Specifically, the hinge mechanism 14 is preset so that small twist restoring force at which the both-side end portions 23 and 24 are going to rotate downward can be generated in the coil portion 22a of the coil spring 22 even in a state where the auxiliary board 12 is arrayed in line with the luggage board 9. In such a way, to whichever degree an angle of the rear seat back 3 may be changed by a reclining operation and the like, a state can be brought up, in which the auxiliary board 12 is allowed to always thrust the back surface of the rear seat back 3 by the twist restoring force of the coil portion 22a of the coil spring 22 that is twisted and deformed.

In accordance with this embodiment described above, as shown in FIG. 2, when each of the rear seat backs 3 is erected and turned into the normal state, the auxiliary board 12 rotates upward about the integral hinge 13. Accordingly, the end portions 24, which are fixed to the auxiliary board 12, among the end portions 23 and 24 of the coil springs 22 are pulled upward while rotating, and the coil portions 22a of the coil springs 22 are turned into a further twisted state, and generate strong twist restoring force.

At this time, the coil portions 22a are merely housed in the space portion S, and do not have any shaft that penetrates the coil portions 22a concerned, and accordingly, can be deformed relatively freely. Specifically, as shown in FIG. 6, with regard to the coil portion 22a of each of the coil springs 22, the end portion 24 on the auxiliary board 12 side is pulled, whereby a positional relationship between the both-side end portions 23 and 24 of the coil spring 22 is changed, and by such a positional change, the entirety of the coil portion 22a of the coil spring 22 will be freely deformed diagonally.

As described above, the coil spring 22 is fixed to the luggage board 9 and the auxiliary board 12 without providing the shaft, whereby the coil spring 22 does not serve as a rotation center axis, and the auxiliary board 12 strictly rotates about the integral hinge 13. Accordingly, the coil spring 22 can be suppressed from hindering the rotation of the auxiliary board 12 about the integral hinge 13.

Moreover, in accordance with this embodiment, as shown in FIG. 3, even in the state where each of the rear seat backs 3 is tilted forward, the small twist restoring force acts on the coil portion 22a of each of the coil springs 22. Accordingly, the auxiliary board 12 also rotates forward by the twist restoring force of the coil portion 22a of the coil spring 22, and the state where the auxiliary board 12 is in contact with the back surface of the rear seat back 3 is maintained. As a result, the auxiliary board 12 can be suppressed from fluttering up and down owing to vibrations and the like of the vehicle when the vehicle is running.

Furthermore, in accordance with this embodiment, such a structure is adopted, in which each of the coil portions 22a is housed in the space portion S provided between the mutually opposite end surfaces 20 and 21 of the luggage board 9 and the auxiliary board 12, and the end portions 23 and 24 on both sides of the coil portion 22a are fixed to the luggage board 9 and the auxiliary board 12, respectively. In such a way, a luggage board structure that is lightweight and simple can be obtained. Moreover, the coil portion 22a is housed in the space portion S, whereby portions of the coil spring 22, which extrude the end portions 23 and 24, can be suppressed from protruding to the outside, and accordingly, the coil spring 22 can be suppressed from interfering with peripheral structures in the luggage room R.

Figure 8:
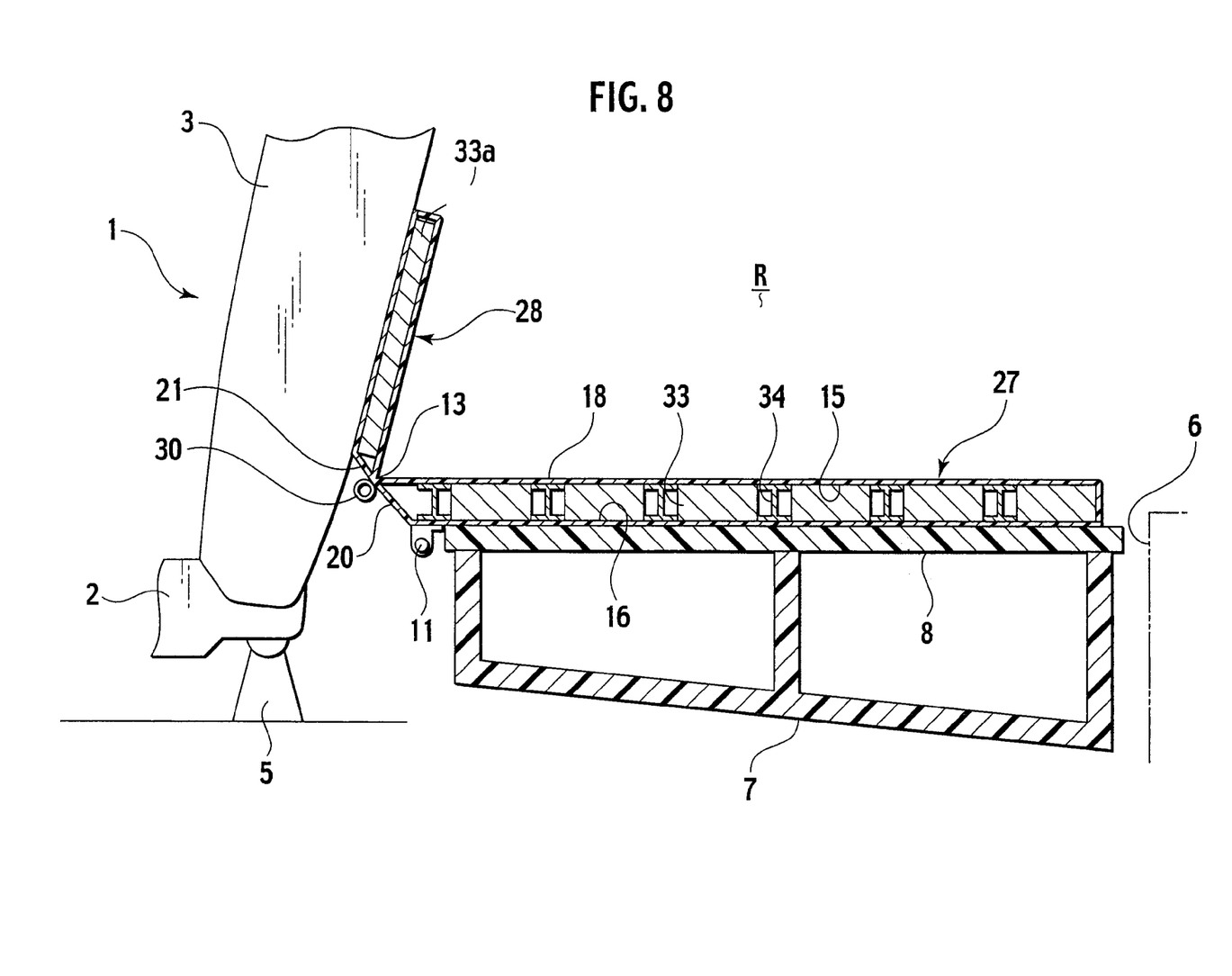
FIG. 8 is a cross-sectional view showing a luggage board and an auxiliary board in a case where a rear seat back according to a second embodiment of the present invention is in a normal state.
Figure 9:
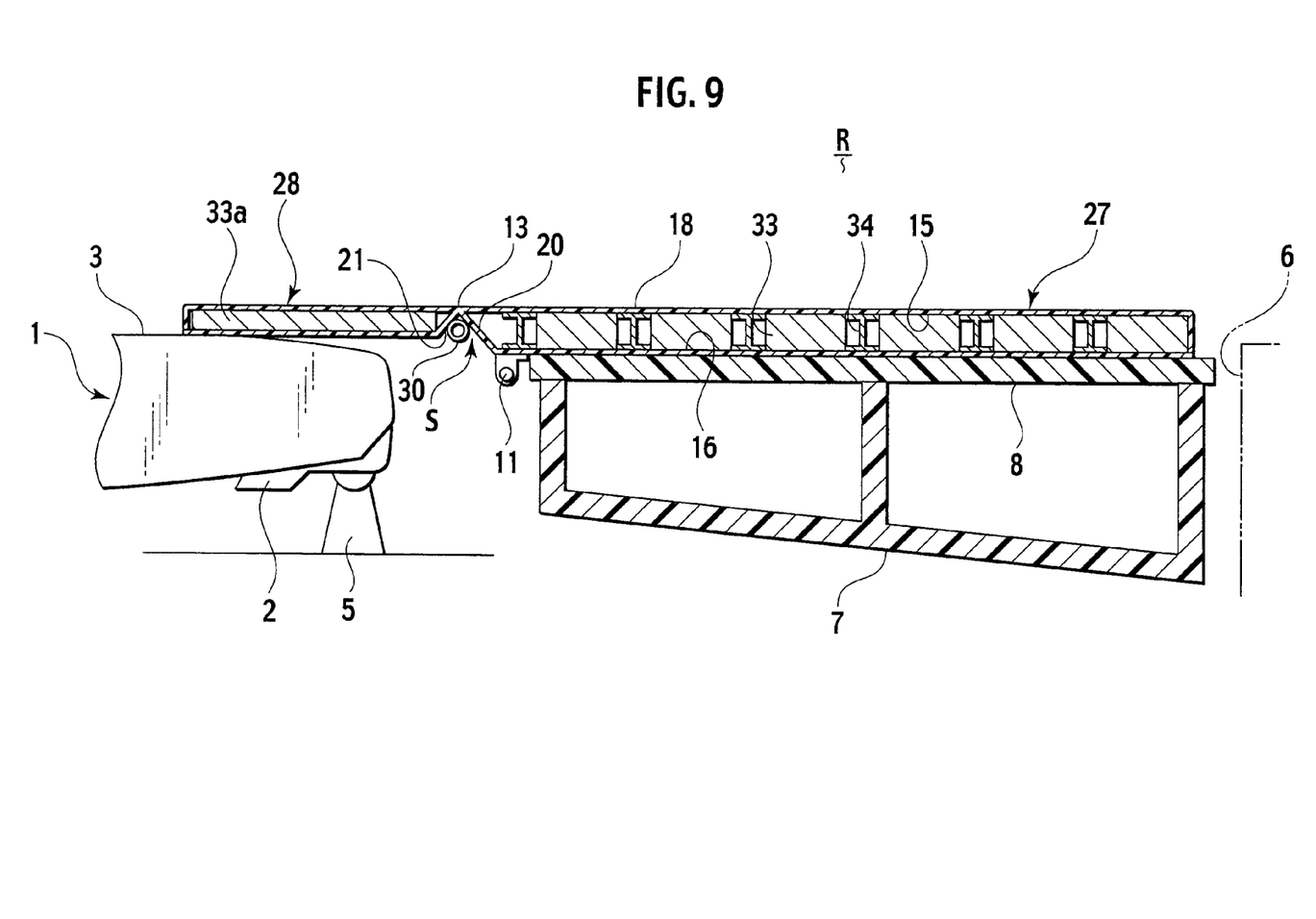
FIG. 9 is a cross-sectional view showing the luggage board and the auxiliary board in a case where the rear seat back according to the second embodiment of the present invention is in a forward tilted state.
Figure 10:
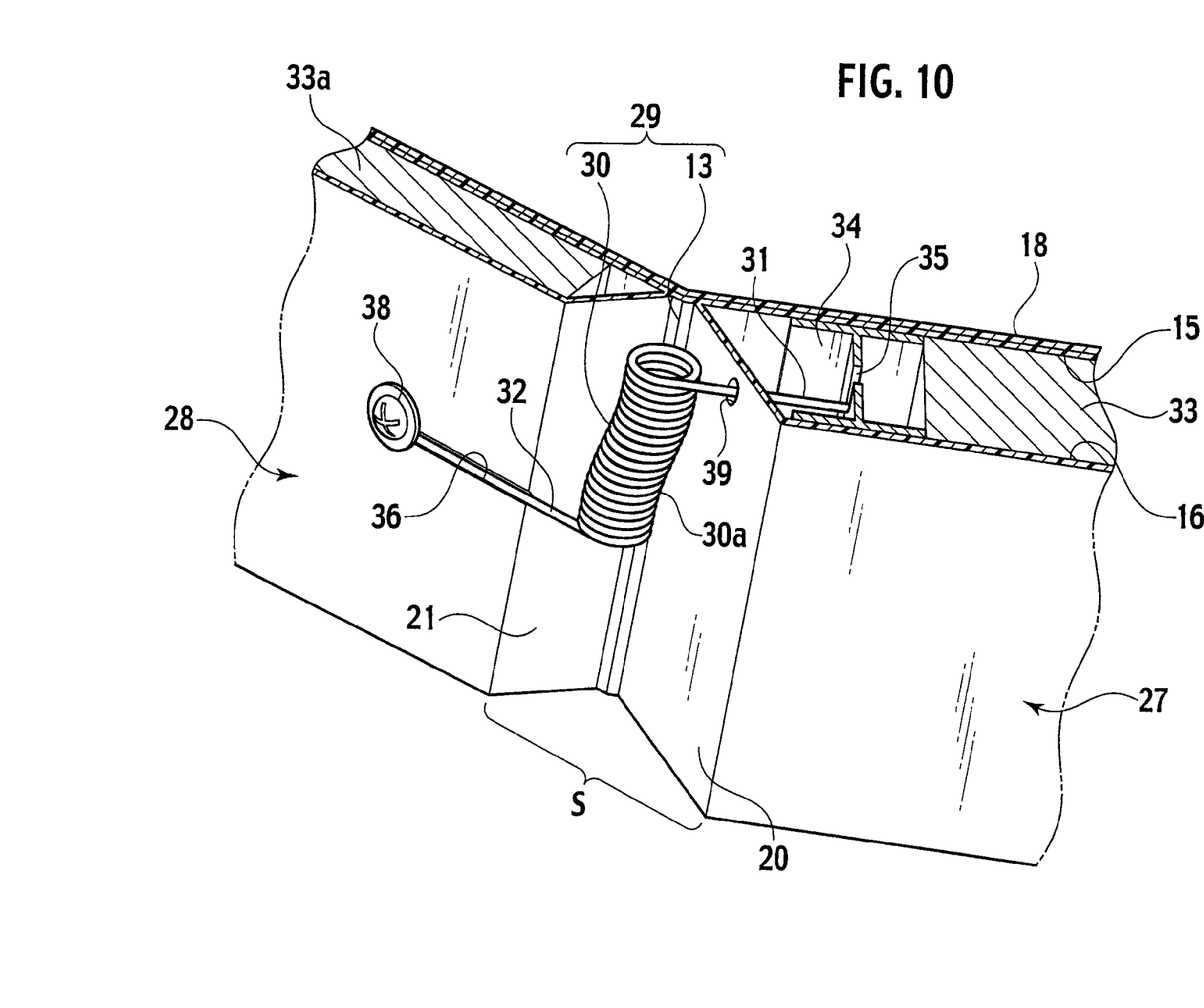
FIG. 10 is a perspective view showing a coil spring in a space portion according to the second embodiment of the present invention.
Figure 11:
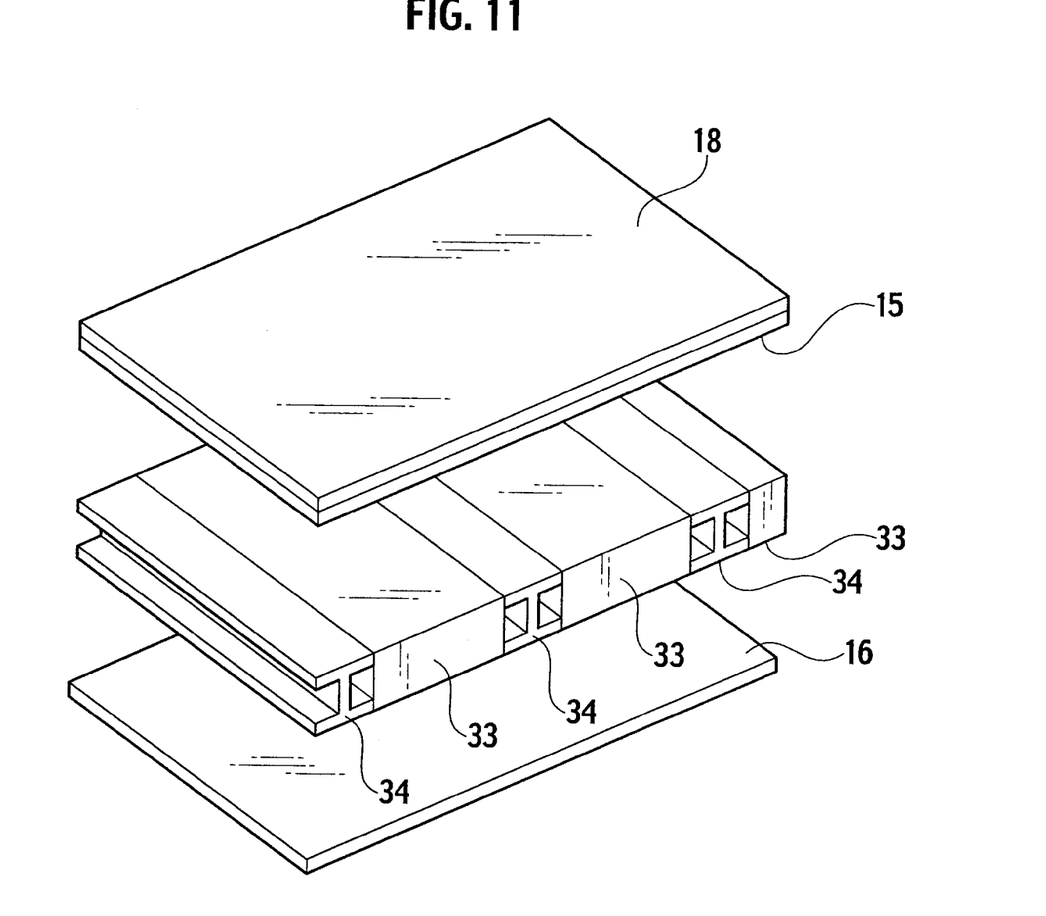
FIG. 11 is an exploded perspective view showing a structure of the luggage board according to the second embodiment of the present invention.
Figure 12:
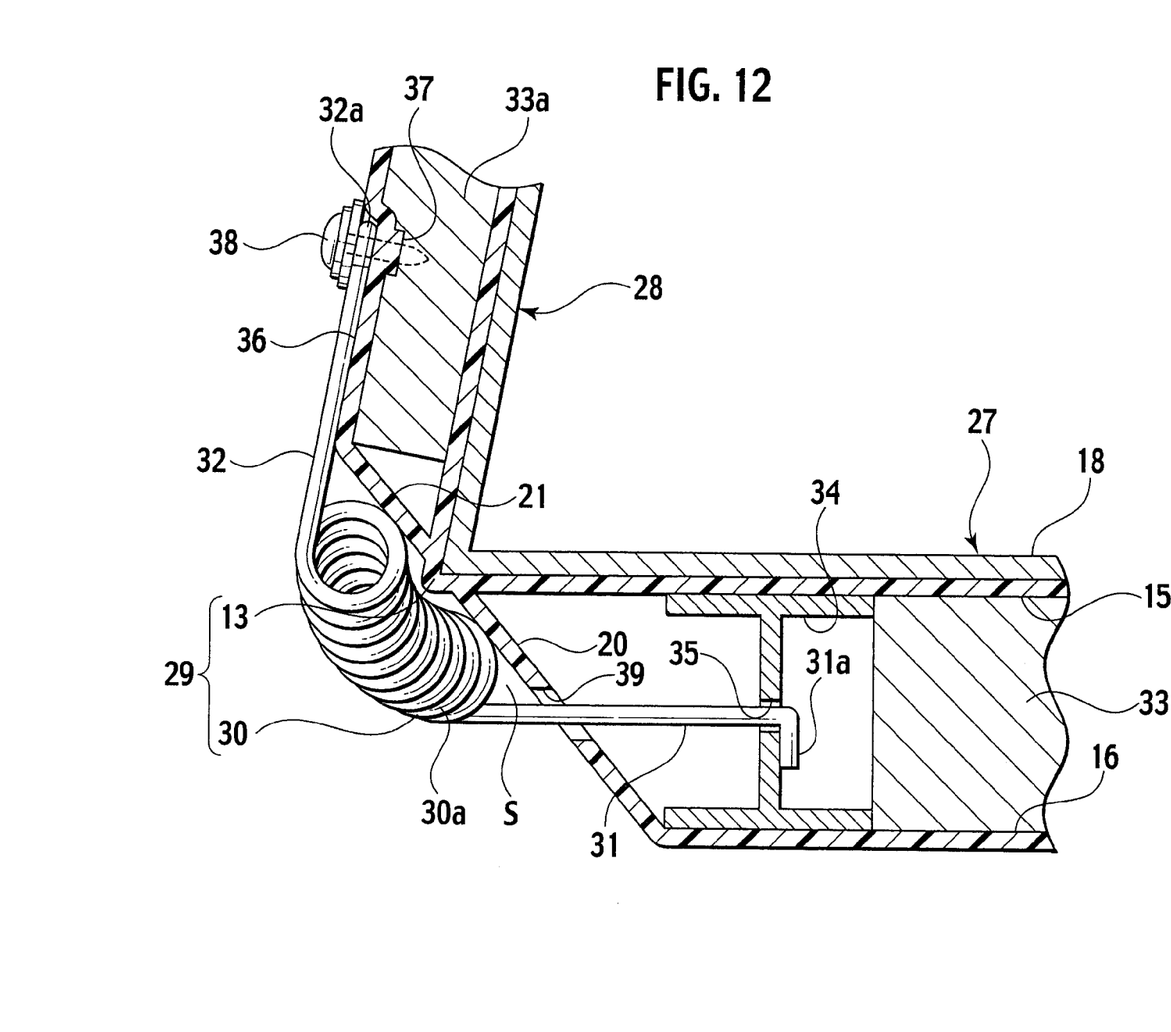
FIG. 12 is a cross-sectional view showing a vicinity of an integral hinge in an erected state of the auxiliary board according to the second embodiment of the present invention.
Figure 13:
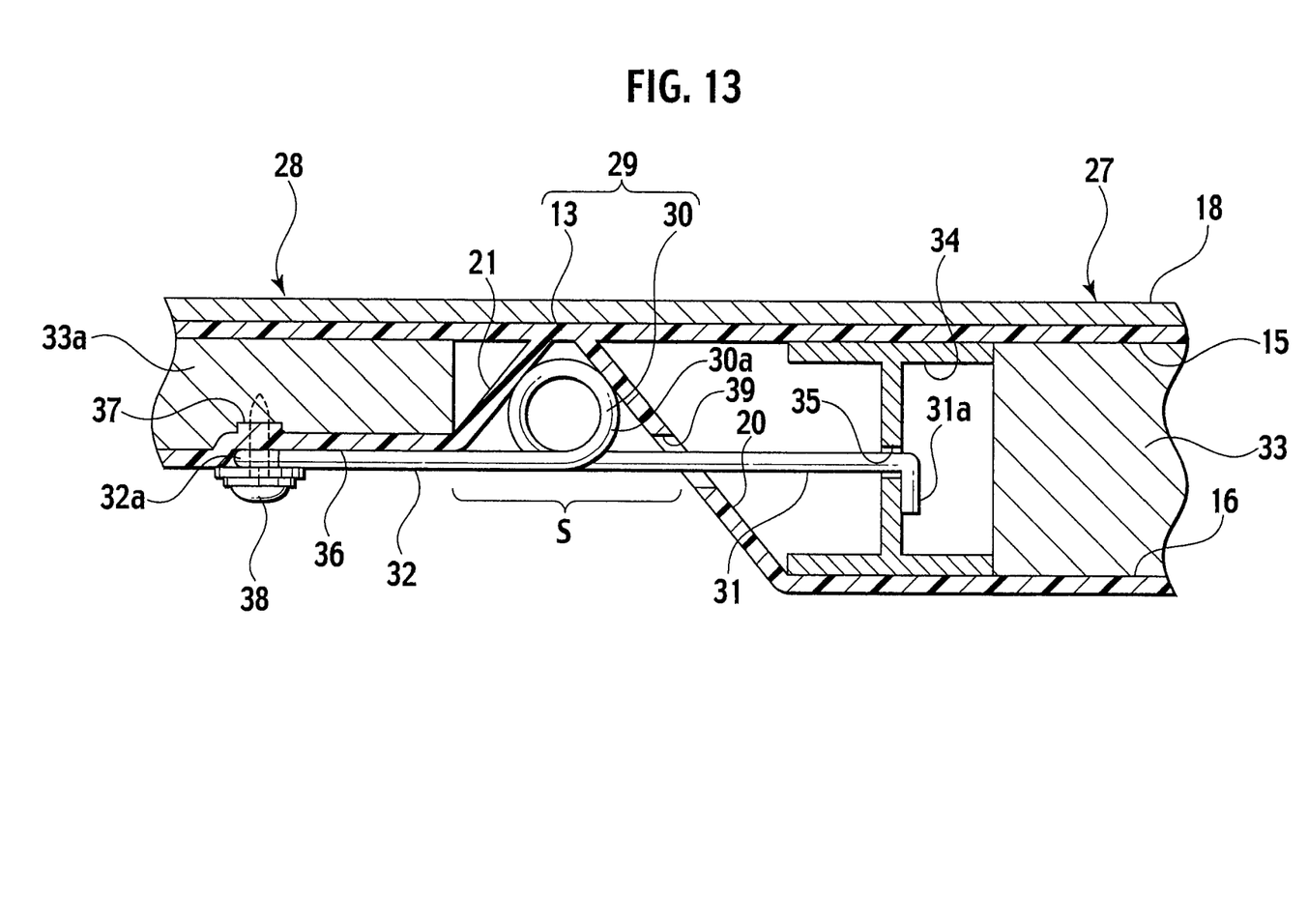
FIG. 13 is a cross-sectional view showing the vicinity of the integral hinge in a forward tilted state of the auxiliary board according to the second embodiment of the present invention.

(Second Embodiment) FIG. 8 is a cross-sectional view showing a luggage board and an auxiliary board in a case where a rear seat back according to this embodiment is in a normal state, FIG. 9 is a cross-sectional view showing the luggage board and the auxiliary board in a case where the rear seat back according to this embodiment is in a forward tilted state, FIG. 10 is a perspective view showing a coil spring in a space portion according to this embodiment, FIG. 11 is an exploded perspective view showing a structure of the luggage board according to this embodiment, FIG. 12 is a cross-sectional view showing a vicinity of an integral hinge in an erected state of the auxiliary board according to this embodiment, and FIG. 13 is a cross-sectional view showing the vicinity of the integral hinge in a forward tilted state of the auxiliary board according to this embodiment. Note that this embodiment includes similar constituents to those of the above-mentioned first embodiment. Hence, common reference numerals are assigned to these similar constituents, and a duplicate description thereof will be omitted.

In this embodiment, a case is illustrated, where the luggage board structure is applied to a type in which the rear seats do not slide but are fixed. Note that, needless to say, it is possible to apply the luggage board structure according to the above-mentioned first embodiment to the type in which the rear seats do not slide but are fixed, and it is possible to apply the luggage board structure according to this embodiment to the type in which the rear seats slide.

In this embodiment, internal structures of a luggage board 27 and auxiliary boards 28 and a way of fixing end portions 31 and 32 of a coil spring 30 in each of hinge mechanisms 29 are different from those of the above-mentioned first embodiment.

In an inside of the luggage board 27 according to this embodiment, foamed materials 33 made of foamed polypropylene and reinforcements 34 as H-shaped extrusion materials made of an aluminum alloy are alternately housed. Note that those made of foamed urethane are also usable as the foamed materials. In this embodiment, the foamed materials 33 are arranged among the reinforcements 34, and the foamed materials 33 are welded to inner surfaces of the respective cover sheets 15 and 16, whereby the luggage board 27 is formed. Then, this luggage board 27 is rotatably supported on side surfaces of the vehicle.

Moreover, in this embodiment, one of the reinforcements 34 is arranged in the vicinity of the integral hinge 13. Then, in a longitudinal surface portion of this reinforcement 34, oblong holes 35 are formed at substantial height center positions thereof. Note that one of the foamed materials 33 may also be arranged in the vicinity of the integral hinge 13.

Moreover, at positions of the end surface 20, which correspond to such long holes 35, insertion holes 39 which go along the vertical direction are formed. Note that, in this embodiment, at the time of forming the luggage board 27, the positions of the end surface 20, which correspond to the long holes 35, are formed to be thin in advance, and a needle is allowed to pierce such thinned regions, whereby the insertion holes 39 are formed.

In insides of the auxiliary boards 28, foamed materials 33a made of the foamed polypropylene are housed. In this embodiment, the foams materials 33a are housed in a state of being welded to inner surfaces of the respective cover sheets 15 and 16 on the auxiliary board 28 side. A thickness of these foamed materials 33a is thinner than a thickness of the foamed material 33 of the luggage board 27. Hence, a thickness of the auxiliary boards 28 becomes thinner than a thickness of the luggage board In such a luggage board 27-side end portion 31 of each of the coil springs 30, on a terminal end thereof, an L-shaped bent portion 31a is formed in an orthogonal direction (direction perpendicular to an axial direction of the coil sprint 30) is formed. Moreover, on a terminal end of the auxiliary board 28-side end portion 32, a U-shaped folded portion 32a is formed along the cover sheet 16 on the back surface side of the auxiliary board 28. Furthermore, a groove portion 36 for housing the end portion 32 of the coil spring 30 is formed on the cover sheet 16 on the back surface side of the auxiliary board 28, and a thick portion 37 is formed on a tip end portion thereof.

The coil spring 30 is fixed to the luggage board 27 in such a manner that the bent portion 31a formed on the end portion 31 thereof on the luggage board 27 side is engaged with the long hole 35 of the reinforcement 34. Specifically, the L-shaped bent portion 31a of the end portion 31 of the coil spring 30 is inserted through the insertion hole 39 into the luggage board 27, and is then inserted into the long hole 35 of the reinforcement 34 in the inside of the luggage board 27 in a state where the coil portion 30a of the coil spring 30 is erected (state where the coil portion 30a is perpendicular to the coil portion 30a housed at a regular position thereof in the space portion S). Thereafter, the coil spring 30 is rotated to be thereby turned into the state of being housed at the regular position thereof in the space portion S, whereby the bent portion 31a is engaged with the long hole 35. In such a way, the end portion 31 of the coil spring 30 is fixed to the luggage board 27.

Next, the auxiliary board 28-side end portion 32 of the coil spring 30 is housed in the groove portion 36 of the cover sheet 16, and the folded portion 32a of the terminal end thereof is fixed by a screw 38 to the thick portion 37 of the cover sheet 16, which is molded in advance on a tip end portion of the groove portion 36.

Also in accordance with this embodiment described above, substantially similar effects to those of the above-mentioned first embodiment can be obtained.

Moreover, in accordance with this embodiment, the end portion 31 of the coil spring 30 is inserted into the inside of the luggage board 27, and is fixed to the reinforcement 34 provided in the inside concerned in the state of being engaged therewith. Accordingly, fixing strength of the end portion 31 of the coil spring 30 can be enhanced.

Moreover, engaged portions of the end portion 31 of the coil spring 30 and the reinforcement 34 are not exposed to the outside, and accordingly, such an engaged state of the end portion 31 of the coil spring 30 and the reinforcement 34 can be suppressed from being released owing to the fact that something collides with the above-described engaged portions, and so on.

Furthermore, the auxiliary board 28-side end portion 32 of the coil spring 30 is also housed in the groove portion 36, and is adapted not to protrude from the cover sheet 16. Accordingly, also on the auxiliary board 28 side, such a fixed state of the end portion 32 and the back surface of the auxiliary board 28 can be suppressed from being broken.

Moreover, in accordance with this embodiment, the end portion 31 of the coil spring 30 is inserted into the inside of the luggage board 27, and is engaged with and fixed to the long hole 35 provided in the reinforcement 34. Accordingly, in comparison with the case of fixing the end portion 31 to upper and lower surfaces of the reinforcement 34, the maximum thickness of the reinforcement 34, which can be taken at the time of constantly setting a thickness of the product, can be increased. Hence, it becomes possible to obtain a thin luggage board 27 of which strength is stronger.

The description has been made above of the preferred embodiments of the present invention; however, the present invention is not limited to the above-described embodiments, and a variety of modifications are possible.

For example, though the one using the coil spring as the spring member has been illustrated in the above-described first and second embodiments, the spring member is not limited to this, and the present invention can be embodied even in the case of using a plate spring, a bar spring, a rubber-made spring member and the like.

Moreover, in the above-described second embodiment, the one in which the luggage board-side end portion of the coil spring is engaged with the reinforcement has been illustrated; however, the reinforcement may be provided in the auxiliary board, and an auxiliary board-side end portion of the coil spring may be engaged therewith, or alternatively, both end portions of the coil spring may be engaged with both of the reinforcements.

Furthermore, in the above-described second embodiment, the H-shaped extrusion material made of the aluminum alloy is used as each of the reinforcements; however, as a material of the reinforcement, a variety of materials such as iron, engineering plastics, and heat-resistant resin can be used, and moreover, a shape of the reinforcement can also be made into a variety of shapes such as a square, a circle, and an I shape.

Moreover, the internal structures of the luggage board and the auxiliary boards are not limited to the above-described embodiments, and those having a variety of structures are usable.

Furthermore, in the above-described first and second embodiments, those in which a shape of the space in a state where the cover sheet on the front surface side of the luggage board and each of the cover sheets on the front surface side of the auxiliary boards are adapted to be substantially horizontal to each other becomes substantially triangular have been illustrated; however, the present invention is not limited to this, and a space with a variety of shapes such as trapezoidal, semicircular, and free-form-curved may be formed.

Industrial Applicability

In accordance with the present invention, the hinge mechanism capable of increasing the rotation angle by means of the lightweight and simple structure can be obtained, and in addition, the automotive luggage board structure using the hinge mechanism can be obtained.

The invention claimed is:

1. An automotive luggage board structure comprising:
    a luggage board that forms a bottom surface of a luggage room located behind a reclinable rear seat back;
    an auxiliary board rotatably attached to the luggage board via an integral hinge such that an upper surface of the luggage board is continuous with an upper surface of the auxiliary board, wherein an end surface of the luggage board and an end surface of the auxiliary board are configured such that a space is formed between the end surface of the luggage board and the end surface of the auxiliary board when the luggage board is arranged in line with the auxiliary board; and
    a spring member having a first end portion fixed to the luggage board and a second end portion fixed to the auxiliary board, the spring member comprising a restoring force generation portion that is disposed in the space between the end surface of the luggage board and the end surface of the auxiliary board when the luggage board is arranged in line with the auxiliary board,
    wherein the spring member does not include a shaft within the restoring force generation portion, such that the restoring force generation portion of the spring member is freely deformable,
    wherein the spring member pushes the auxiliary board towards the reclinable rear seat back.

2. The automotive luggage board structure according to claim 1, wherein:
    the luggage board includes a front surface side sheet and a back surface side sheet, and the auxiliary board includes a front surface side sheet and a back surface side sheet, and
    when the front surface side sheet of the luggage board is arranged in line with the front surface side sheet of the auxiliary board an upper surface of the integral hinge is coplanar with an upper surface of the front surface side sheet of the luggage board and an upper surface of the front surface side sheet of the auxiliary board.

3. The automotive luggage board structure according to claim 1, wherein:
    the back surface side sheet of the luggage board and the back surface side sheet of the auxiliary board are formed of resin, and
    both end portions of the spring member are fixed to the back surface side sheets of the luggage board and the auxiliary board via resin plates.

4. The automotive luggage board structure according to claim 1, wherein:
    at least one member selected from the group consisting of (i) the luggage board, and (ii) the auxiliary board, includes a reinforcement, and
    at least one of the end portions of the spring member is fixed to the reinforcement.

5. The automotive luggage board structure according to claim 2, wherein:
    the back surface side sheet of the luggage board and the back surface side sheet of the auxiliary board are formed of resin, and
    both end portions of the spring member are fixed to the back surface side sheets of the luggage board and the auxiliary board via resin plates.

6. The automotive luggage board structure according to claim 2, wherein: at least one member selected from the group consisting of (i) the luggage board, and (ii) the auxiliary board, includes a reinforcement, and
    at least one of the end portions of the spring member is fixed to the reinforcement.

* * * * *